United States Patent
Cole et al.

(10) Patent No.: US 6,195,702 B1
(45) Date of Patent: Feb. 27, 2001

(54) MODEM FOR MAINTAINING CONNECTION DURING LOSS OF CONTROLLER SYNCHRONISM

(75) Inventors: Terry L. Cole; David M. Kaplowitz, both of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 08/980,581

(22) Filed: Dec. 1, 1997

(51) Int. Cl.[7] ..................................................... G06F 15/16
(52) U.S. Cl. ............................................ 709/237; 710/52
(58) Field of Search ...................... 712/200; 395/200.61; 358/434, 438, 442; 341/50; 375/222, 377; 455/557; 463/41; 709/237, 213, 244, 227, 246, 250; 710/52–57

(56) References Cited

U.S. PATENT DOCUMENTS

| | | | |
|---|---|---|---|
| 4,833,706 | * 5/1989 | Hughes-Hartogs | 379/93.31 |
| 5,054,034 | * 10/1991 | Hughes-Hartogs | 375/222 |
| 5,197,067 | * 3/1993 | Fujimoto et al. | 370/236 |
| 5,202,905 | * 4/1993 | Sakamoto et al. | 375/377 |
| 5,535,014 | * 7/1996 | Sommer | 358/434 |
| 5,541,955 | * 7/1996 | Jacobsmeyer | 375/222 |
| 5,721,830 | * 2/1998 | Yeh et al. | 709/237 |
| 5,790,770 | * 8/1998 | McClure et al. | 395/200.61 |
| 5,889,480 | * 3/1999 | Kim | 341/50 |
| 5,930,480 | * 7/1999 | Staats | 709/244 |

\* cited by examiner

*Primary Examiner*—John A. Follansbee
(74) *Attorney, Agent, or Firm*—Williams, Morgan & Amerson, P.C.

(57) ABSTRACT

An improved modem is disclosed. In a preferred embodiment, the improved modem detects a loss of host synchronism, indicated by an under flow event such as a lack of, or impending lack of data from the host. Normally, the under flow event would result in a lack of data to be sent to a receiving modem, causing a communication link between the two modems to be broken. The improved modem notifies the host of the under flow event and supplies alternate data to the data encoding unit of the modem in order to keep the communication link established. The alternate data supplied is typically an instruction or other action that requires no data from the host and keeps the communication link active. When the host regains synchronism, the host sends data to the modem and normal processing continues.

20 Claims, 8 Drawing Sheets

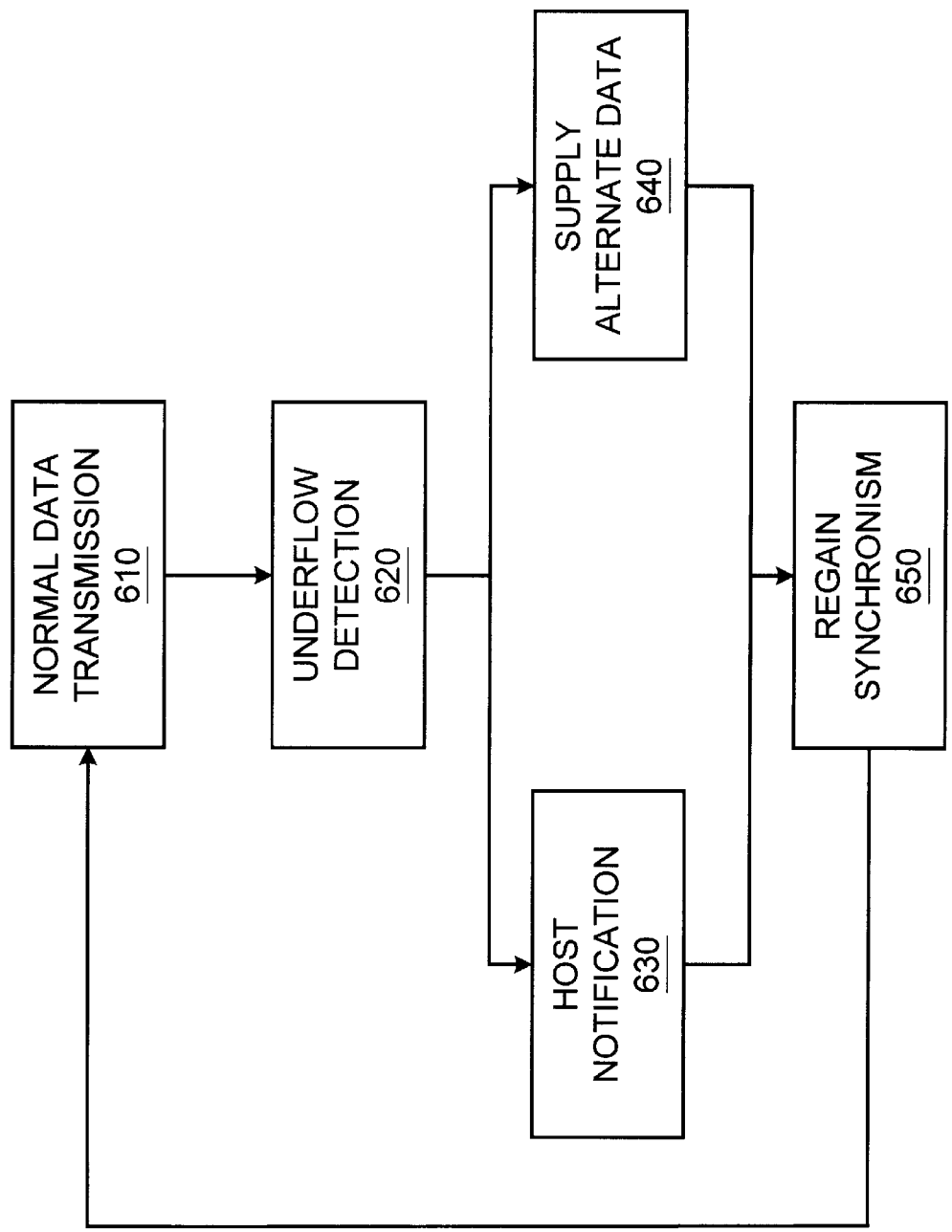

MODEM FOR MAINTAINING CONNECTION DURING LOSS OF CONTROLLER SYNCHRONISM

BACKGROUND OF THE INVENTION

1. Field of the Invention

This invention relates to modem technology, and in particular maintaining connection during loss of controller synchronism.

2. Background

Modems typically connect two computers across telephone lines. Current telephone lines are designed to carry voice signals in the form of a modulated analog wave form. Modems convert digital data from a computer into an audio wave form that can be sent over current telephone lines. A first computer system, designated calling computer, instructs a modem to dial and establish a connection with a second modem. The second modem is connected to another computer system, designated receiving computer. The first modem converts digital information from the calling computer into an audio wave form to send across telephone lines. The second modem receives the audio wave form from the telephone lines and converts the wave forms into digital information which is sent to the receiving computer. This communication link can be bi-directional. In other words, both computer systems may send and receive information through the modems to the other computer system.

The modems communicate to each other via communication protocols. These communication protocols include modulation protocols, error control protocols and data compression protocols. Modulation protocols define the specific techniques of encoding and decoding the digital bits into the audio wave form and the data transfer speed. Two modems can establish a connection only when they share a common modulation protocol.

So that modems from different manufactures can communicate, there are several industry established communication protocols. Two standard modulation protocols for high speed modems are V.32 and V.32bis, established by the CCITT (the International Telegraph and Telephone Consultative Committee). V.42, established by CCITT, is an example of an error control protocol. V.42bis, established by CCITT, is an example of a data compression protocol.

To establish a connection between two modems, a training signal is typically used. This involves establishing a reference signal in the form of an audio wave form between the two modems in order to synchronize the interfaces. Once synchronization is established, the modems can send and receive data. All subsequent audio wave forms received are compared to the reference signal in the decoding of the digital information. A training signal occasionally needs to be reconfigured after a connection is already established. This occurs to recover from various disruptions such as line outages, bursts of noise on the line, or other such line interference.

The conversion of the digital data from a computer into an audio wave form by the sending modem is accomplished by using the reference wave form. By varying the amplitude and phase of the audio wave form compared to the reference wave form, digital data can be encoded. Different states are assigned to different bits. Amplitude is the loudness of the signal. There may be two or more states for amplitude, such as states loud and soft. Phase refers to the phase angle difference of the audio wave form when compared to the reference wave form. Adding phase states allows more data bits to be encoded. For example, with two amplitudes, and four phases, three bits of data can be encoded. Data bits 000 can be defined as soft, zero degree phase, data bits 001 can be defined as soft, 90 degree phase, data bits 111 as loud, 270 degree phase, etc. The addition of more amplitude and phase states allows additional data to be encoded.

The sending modem converts digital data from the computer system and sends the information across phone lines to another computer system. Occasionally, the computer system fails to send enough data to the modem to keep the line active.

When not enough data is received by the sending modem, the modem typically runs out of data to send and the connection may be lost. A variety of conditions may cause the computer system to fail to send enough data to the modem. For example, the computer may be too busy doing other tasks. Some applications bog down a computer system when large amounts of data need to be transferred causing the bus to exceed bandwidth limitations.

Loss of the communication link can be annoying as well as expensive to a computer user. The connection must be reestablished, transferred data may be lost and must be resent, reconnection costs are incurred including additional toll charges and on-line service charges, and time is lost.

SUMMARY OF THE INVENTION

An improved modem that maintains connections during loss of computer system synchronism is disclosed. The improved modem first detects a loss of synchronism from a computer system by detecting a lack of, or impending lack of, data from the computer system to send. The intelligent modem then notifies the computer system of the condition. The intelligent modem also supplies alternate data to keep the interface active and the connection established until the controller regains synchronization.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

FIG. 4 is a flow diagram of a preferred embodiment of the present invention.

DETAILED DESCRIPTION OF PREFERRED EMBODIMENTS

Figure 1:
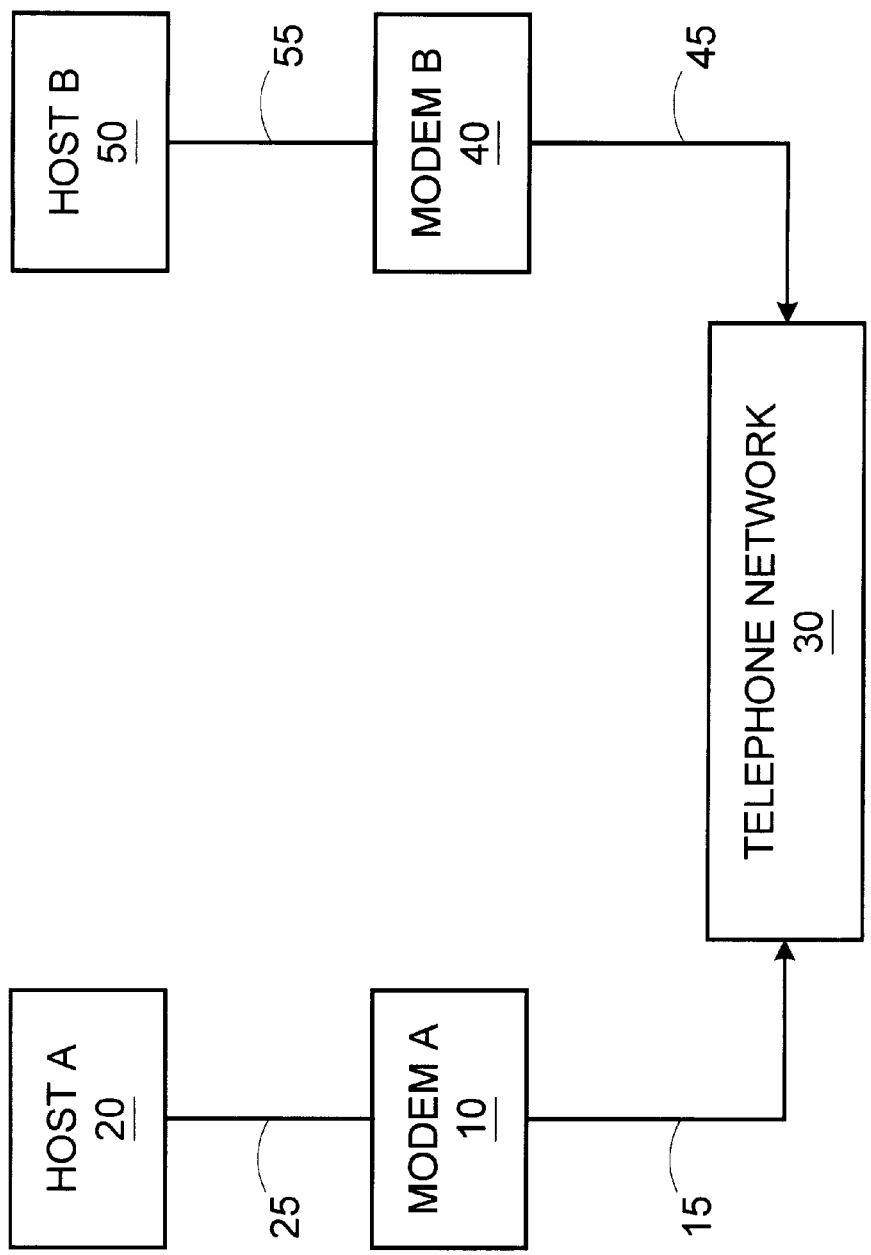
FIG. 1 is a block diagram of a system utilized by the present invention.

FIG. 1 is a block diagram of a system utilized by the present invention. Host A 20 communicates to Host B 50 through the use of Modem A 10, a telephone network 30, and Modem B 40. Host A 10, typically a computer system, is connected to Modem A 10 via host bus 25. Host bus 25 is typically a digital bus on a motherboard, such as an ISA or PCI bus, but may also be an internal motherboard connector or an external cable connector. Modem A 10 communicates to Modem B 40 across a telephone network 30. Modem A 10 is connected to telephone network 30 via local telephone line 15. Telephone network 30 may include several links into switches, T1 trunk lines, etc. Modem B 40 is connected to telephone network 30 via local telephone line 45. Modem B 40 is connected to Host B 50 via host bus 55.

For Host A 20 to establish a communication link with Host B 50, Host A 20 instructs Modem A 10 to establish a connection with Modem B 40. Modem A 10 dials Modem B 40 though the telephone network 30. Once Modem A 10 and Modem B 40 have synchronized interfaces and established a common communication protocol, Host A 20 sends digital data to Modem A 10. The digital data is converted into the established common communication protocol and into an audio wave form by Modem A 10. The audio wave form is sent to Modem B 40 which converts the wave form back into digital data. Modem B 40 sends the digital data to Host B 50.

Figure 2A:
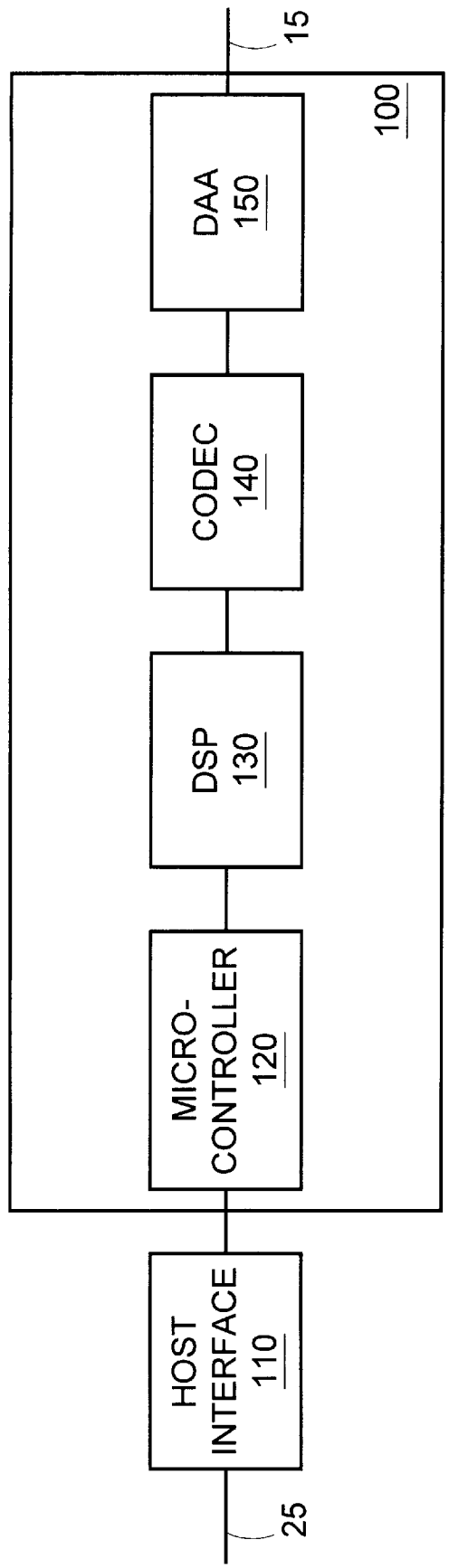
FIG. 2A is a block diagram of the data sending portion of a prior art modem.

FIG. 2A is a block diagram of the data sending portion of a prior art modem. Host interface 110 receives instructions and digital data from a host or computer system across host bus 25. Host interface 110 typically receives data from host bus 25 in bit, byte (8 bits), word (16 bits), or d-word (32 bits) format. Host interface 110 typically has buffers to store large amounts of data. This enables the host to periodically send large amounts of data to be processed instead of continuously sending smaller amounts.

Host interface 110 sends the digital data to microcontroller 120. Microcontroller 120 formats the digital data according to a communication protocol. Microcontroller 120 sends the data in protocol format to DSP 130 (Digital Signal Processor). DSP 130 modulates the data according to an established common modulation protocol. The modulated data is sent to CODEC 140. CODEC 140 converts the modulated data into analog signals in the form of an audio wave form. The analog signals are sent to DAA 150 (Data Access Arrangement). DAA 150 conditions the analog signals for coupling to the telephone line. The conditioned audio wave form is sent to local telephone line 15. Microcontroller 120, DSP 130, CODEC 140 and DAA 150 together form data encoding unit 100.

Figure 2B:
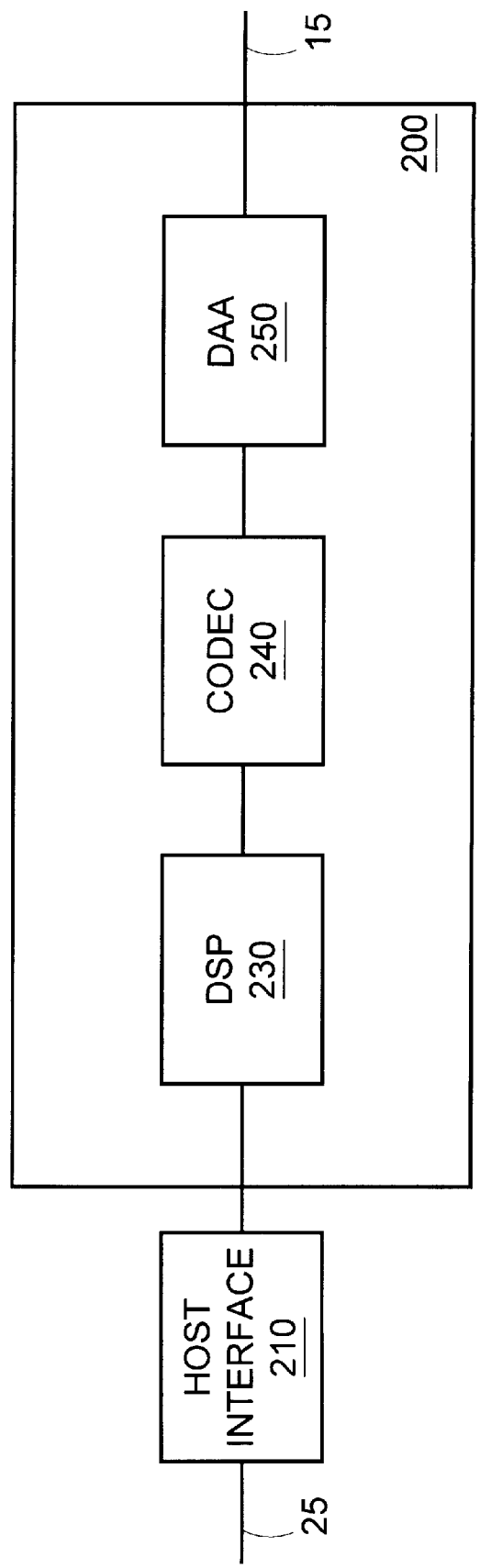
FIG. 2B is a block diagram of the data sending portion of another prior art modem.

FIG. 2B is a block diagram of the data sending section of another prior art modem. In this modem, there is not a microcontroller. The host must send data in protocol format to the modem. Host interface 210 receives data in protocol format from a host or computer system across host bus 25. Host interface 210 typically receives data from host bus 25 in bit, byte (8 bits), word (16 bits), or d-word (32 bits) format. Host interface 210 typically has buffers to store large amounts of data. This enables the host to periodically send large amounts of data to be processed instead of continuously sending smaller amounts.

Host interface 210 sends the data in protocol format to DSP 230 (Digital Signal Processor). DSP 230 modulates the data according to an established common modulation protocol. The modulated data is sent to CODEC 240. CODEC 240 converts the encoded data into analog signals in the form of an audio wave form. The analog signals are sent to DAA 250 (Data Access Arrangement). DAA 250 conditions the analog signals for coupling to the telephone line. The conditioned audio wave form is sent to local telephone line 15. DSP 230, CODEC 240 and DAA 250 together form data encoding unit 200.

Figure 2C:
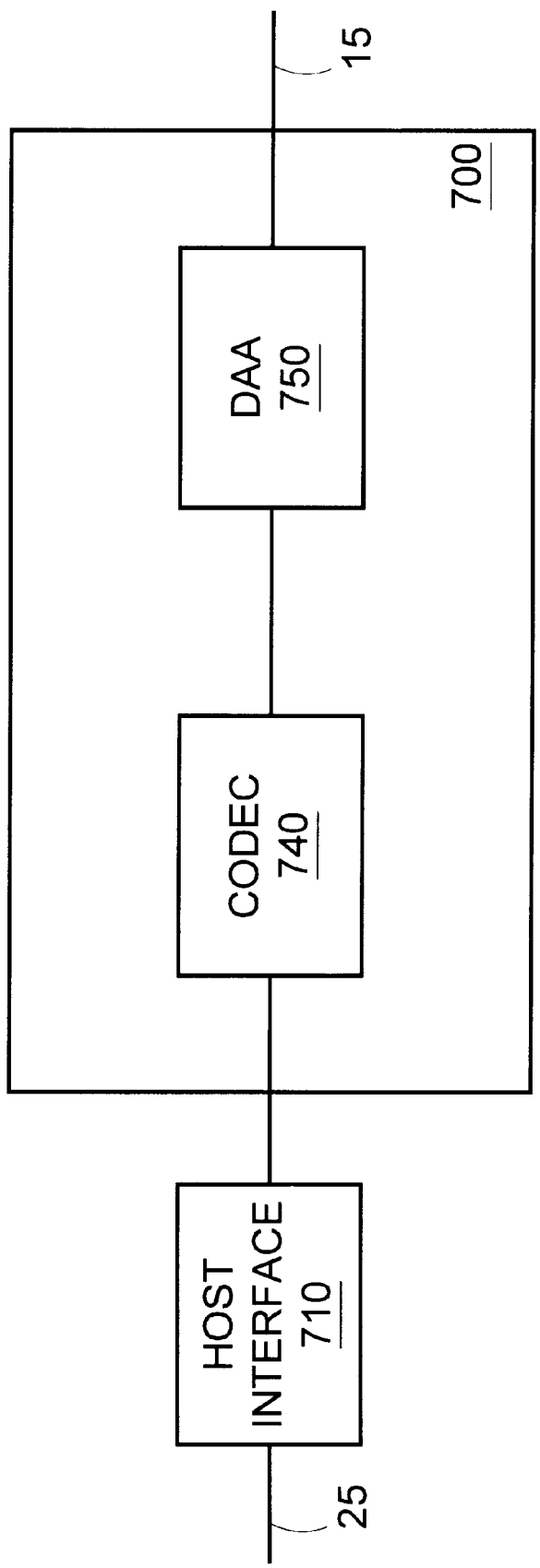
FIG. 2C is a block diagram of the data sending portion of a third prior art modem.

FIG. 2C is a block diagram of the data sending section of a third prior art modem. In this modem, the data encoding unit 700 consists of a CODEC and a DAA. The host must send modulated data to the modem. Host interface 710 receives data in protocol format from a host or computer system across host bus 25. Host interface 710 typically receives modulated data from host bus 25 in bit, byte (8 bits), word (16 bits), or d-word (32 bits) format. Host interface 710 typically has buffers to store large amounts of data. This enables the host to periodically send large amounts of data to be processed instead of continuously sending smaller amounts.

Host interface 710 sends the modulated data to CODEC 740. CODEC 740 converts the encoded data into analog signals in the form of an audio wave form. The analog signals are sent to DAA 750 (Data Access Arrangement). DAA 750 conditions the analog signals for coupling to the telephone line. The conditioned audio wave form is sent to local telephone line 15. CODEC 740 and DAA 750 together form data encoding unit 700.

Figure 3A:
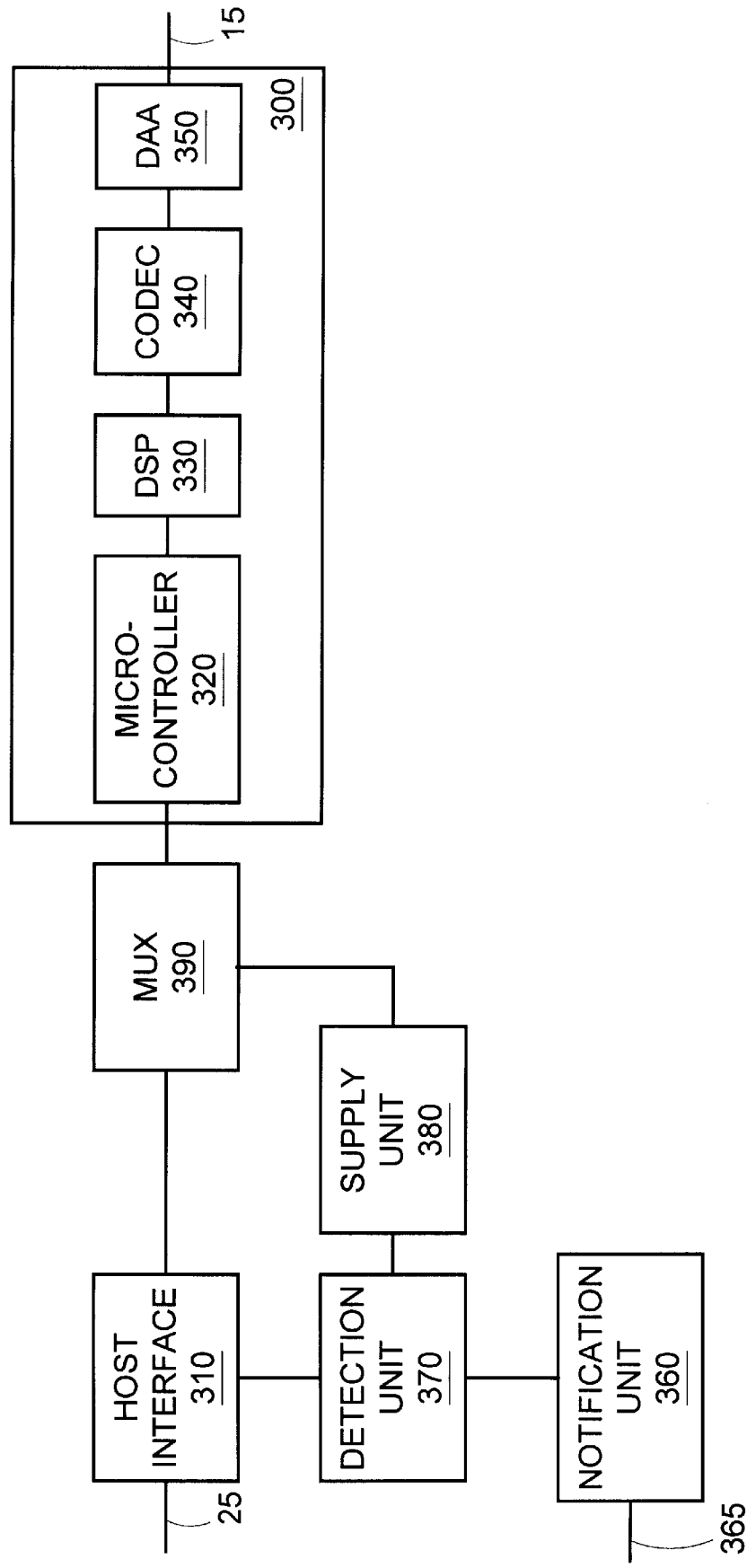
FIG. 3A is a block diagram of the data sending portion of a modem implementing the present invention.

FIG. 3A is a block diagram of the data sending section of a modem implementing the present invention. Host interface 310 receives instructions and digital data from a host or computer system across host bus 25. Host interface 310 typically receives data from host bus 25 in bit, byte (8 bits), word (16 bits), or d-word (32 bits) format. Host interface 310 typically has buffers to store large amounts of data. This enables the host to periodically send large amounts of data to be processed instead of continuously sending smaller amounts.

Host interface 310 sends the digital data to a first input port of multiplexer 390. Multiplexer 390 selects data from either of two input ports and sends that data, unchanged, to microcontroller 320. Microcontroller 320 formats the digital data according to a communication protocol. Microcontroller 320 sends the data in protocol format to DSP 330 (Digital Signal Processor). DSP 330 modulates the data according to an established common modulation protocol. The modulated data is sent to CODEC 340. CODEC 340 converts the encoded data into alalog signals in the form of an audio wave form. The analog signals are sent to DAA 350 (Data Access Arrangement). DAA 350 conditions the analog signals for coupling to the telephone line. The conditioned audio wave form is sent to local telephone line 15. Microcontroller 320, DSP 330, CODEC 340 and DAA 350 together form data encoding unit 300.

Detection unit 370 monitors the digital data received by host interface 310 and detects when the host loses synchronism. Loss of host synchronism is indicated by a lack of enough data received from the host needed to keep the communication link between the two modems established. The lack of enough data received from the host causes the buffers in host interface 310 to be empty or almost empty.

When a loss of host synchronism is detected, detection unit 370 notifies notification unit 360 and supply unit 380 of the condition. Notification unit 360 notifies the host of the condition via communication port 365. Communication port 365 may be an interrupt signal to the host, a read register that the host routinely polls or any other communication method to notify the host of the loss of synchronism. Supply unit 380 provides data to keep the communication link established. Data is sent to a second input of multiplexer 390.

Data provided is any communication protocol instruction or digital data that does not require the sending of digital data received from the host such that the communication link remains established between two modems. For example, supply unit 380 may supply a training instruction, such that the communication link remains established synchronizing the two modems without having to send data. Supply unit 380 may supply other instructions and data such as an idle signal or a negotiation handshake. By sending such instructions or data to multiplexer 390 and then on to data encoding unit 300, the communication link is kept active without having to send digital data received from the host. The receiving modem is unaware of the loss of sending host synchronism since the communication link is still active.

When host synchronism is regained, the host will take the necessary steps to continue sending data. This may include completing a handshake operation that supply unit 380 has begun, resetting the interface, or simply supplying host interface 310 with digital data and instructions to send.

Figure 3B:
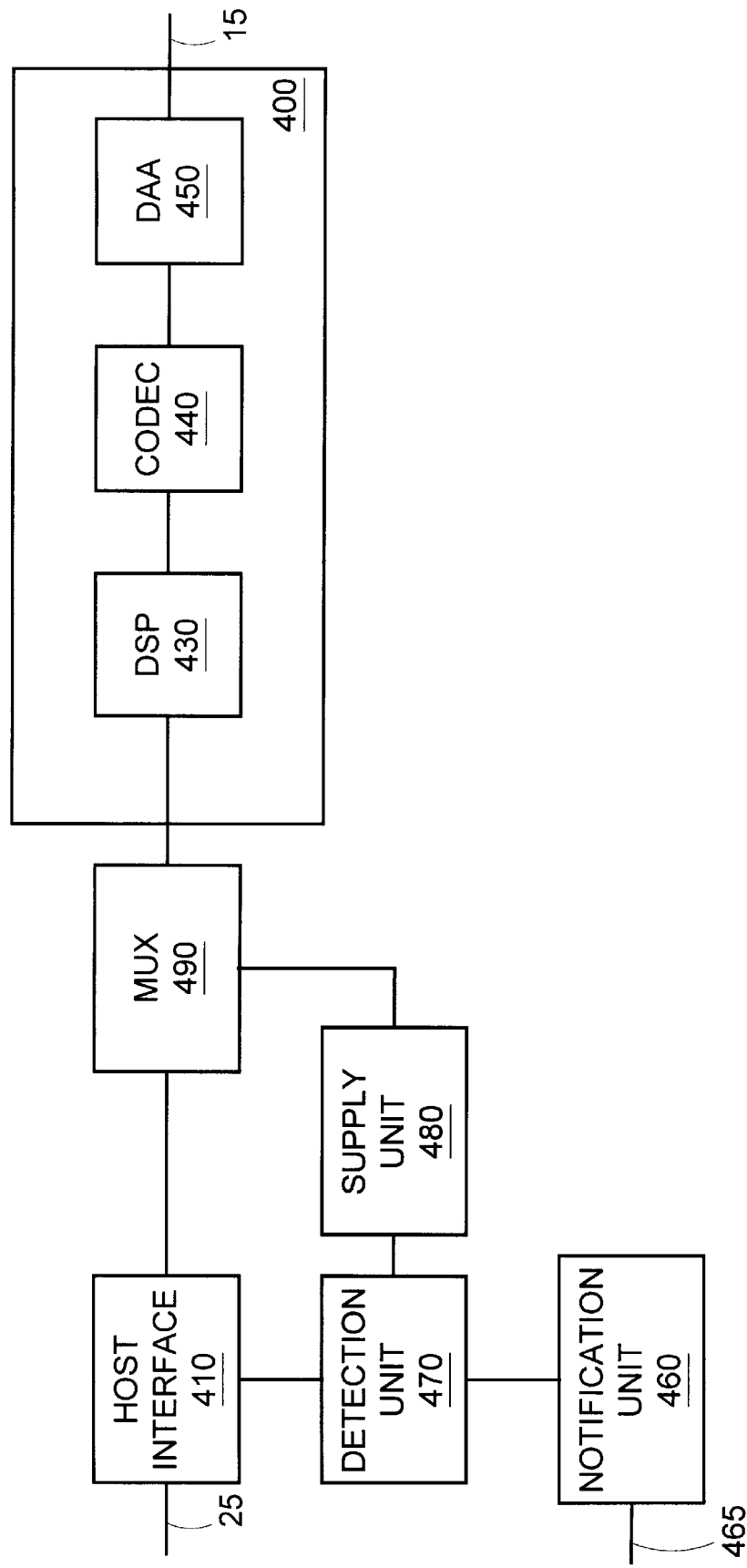
FIG. 3B is a block diagram of the data sending portion of another embodiment of a modem implementing the present invention.

FIG. 3B is a block diagram of the data sending section of another embodiment of a modem implementing the present invention. In this modem implementing the present invention, there is not a microcontroller. The host must send data in protocol format to the modem. Host interface 410 receives data in protocol format from a host or computer system across host bus 25. Host interface 410 typically receives data from host bus 25 in bit, byte (8 bits), word (16 bits), or d-word (32 bits) format. Host interface 410 typically has buffers to store large amounts of data. This enables the host to periodically send large amounts of data to be processed instead of continuously sending smaller amounts.

Host interface 410 sends the data in protocol format to a first input port of multiplexer 490. Multiplexer 490 selects data from either of two input ports and sends that data, unchanged, to DSP 430 (Digital Signal Processor). DSP 430 modulates the data according to an established common modulation protocol. The modulated data is sent to CODEC 440. CODEC 440 converts the encoded data into analog signals in the form of an audio wave form. The analog signals are sent to DAA 450 (Data Access Arrangement). DAA 450 conditions the analog signals for coupling to the telephone line. The conditioned audio wave form is sent to local telephone line 15. DSP 430, CODEC 440 and DAA 450 together form data encoding unit 400.

Detection unit 470 monitors the data received by host interface 410 and detects when the host loses synchronism. Loss of host synchronism is indicated by a lack of enough data received from the host needed to keep the communication link between the two modems established. The lack of enough data received from the host causes the buffers in host interface 410 to be empty or almost empty.

When a loss of host synchronism is detected, detection unit 470 notifies notification unit 460 and supply unit 480 of the condition. Notification unit 460 notifies the host of the condition via communication port 465. Communication port 465 may be an interrupt signal to the host, a read register that the host routinely polls or any other communication method to notify the host of the loss of synchronism. Supply unit 480 provides data to keep the communication link established. Data is sent to a second input of multiplexer 490.

Data provided is any communication protocol instruction or digital data that does not require the sending of digital data received from the host such that the communication link remains established between two modems. For example, supply unit 480 may supply a training instruction, such that the communication link remains established synchronizing the two modems without having to send data. Supply unit 480 may supply other instructions and data such as an idle signal or a negotiation handshake. By sending such instructions or data to multiplexer 490 and then on to data encoding unit 400, the communication link is kept active without having to send digital data received from the host. The receiving modem is unaware of the loss of sending host synchronism since the communication link is still active.

When host synchronism is regained, the host will take the necessary steps to continue sending data. This may include completing a handshake operation that supply unit 480 has begun, resetting the interface, or simply supplying host interface 410 with digital data and instructions to send.

Figure 3C:
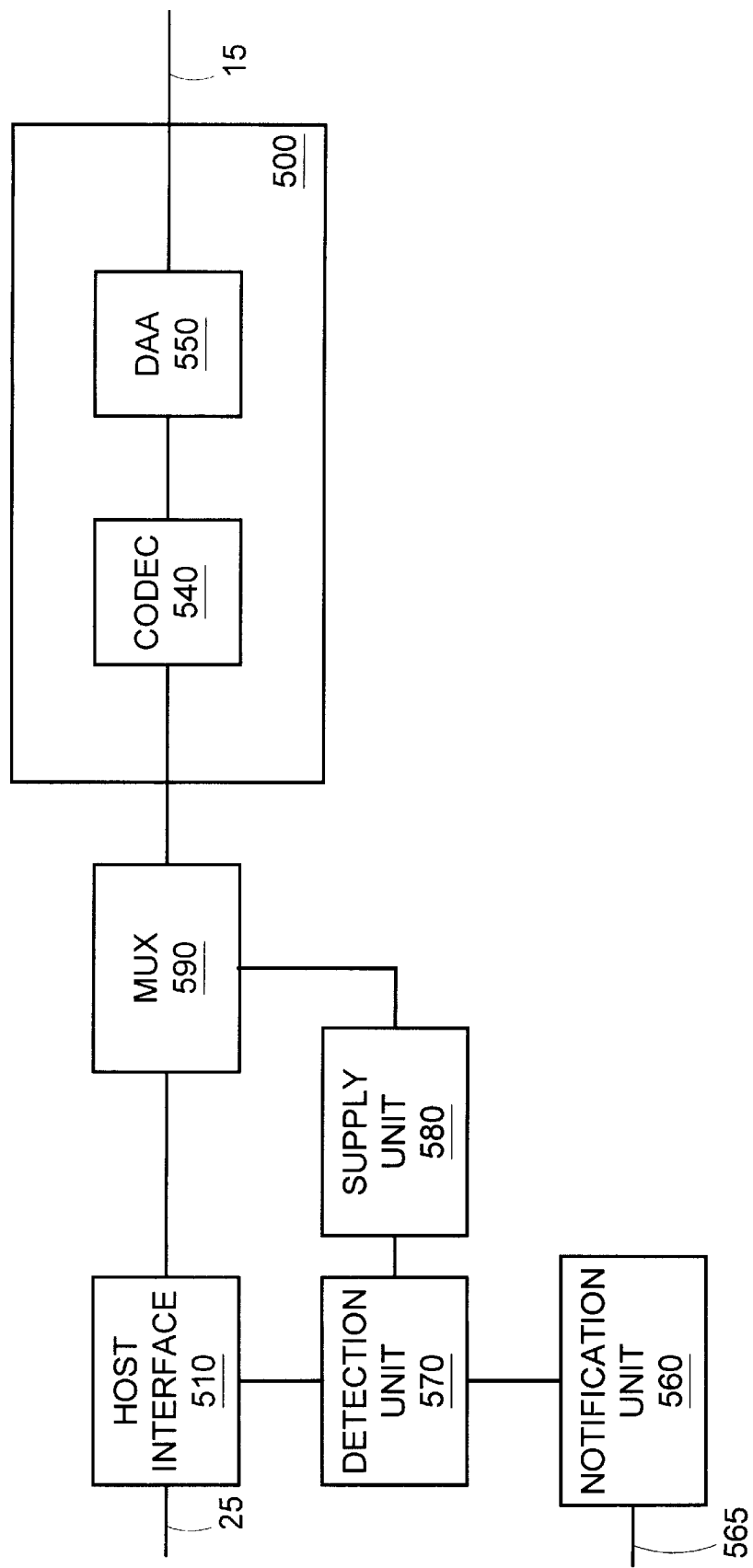
FIG. 3C is a block diagram of the data sending portion of a third embodiment of a modem implementing the present invention.

FIG. 3C is a block diagram of the data sending section of a third embodiment of a modem implementing the present invention. In this modem implementing the present invention, the data encoding unit 500 consists of a CODEC and a DAA. The host must send modulated data to the modem. Host interface 510 receives modulated data from a host or computer system across host bus 25. Host interface 510 typically receives data from host bus 25 in bit, byte (8 bits), word (16 bits), or d-word (32 bits) format. Host interface 510 typically has buffers to store large amounts of data. This enables the host to periodically send large amounts of data to be processed instead of continuously sending smaller amounts.

Host interface 510 sends the data in protocol format to a first input port of multiplexer 590. Multiplexer 590 selects data from either of two input ports and sends that data, unchanged, to CODEC 540. CODEC 540 converts the encoded data into analog signals in the form of an audio wave form. The analog signals are sent to DAA 550 (Data Access Arrangement). DAA 550 conditions the analog signals for coupling to the telephone line. The conditioned audio wave form is sent to local telephone line 15. CODEC 540 and DAA 550 together form data encoding unit 500.

Detection unit 570 monitors the data received by host interface 510 and detects when the host loses synchronism. Loss of host synchronism is indicated by a lack of enough data received from the host needed to keep the communication link between the two modems established. The lack of enough data received from the host causes the buffers in host interface 510 to be empty or almost empty.

When a loss of host synchronism is detected, detection unit 570 notifies notification unit 560 and supply unit 580 of the condition. Notification unit 560 notifies the host of the condition via communication port 565. Communication port 565 may be an interrupt signal to the host, a read register that the host routinely polls or any other communication method to notify the host of the loss of synchronism. Supply unit 580 provides data to keep the communication link established. Data is sent to a second input of multiplexer 590.

Data provided is any communication protocol instruction or digital data that does not require the sending of digital data received from the host such that the communication link remains established between two modems. For example, supply unit 580 may supply a training instruction, such that the communication link remains established synchronizing the two modems without having to send data. Supply unit 580 may supply other instructions and data such as an idle signal or a negotiation handshake. By sending such instructions or data to multiplexer 590 and then on to data encoding unit 500, the communication link is kept active without having to send digital data received from the host. The receiving modem is unaware of the loss of sending host synchronism since the communication link is still active.

When host synchronism is regained, the host will take the necessary steps to continue sending data. This may include completing a handshake operation that supply unit 580 has begun, resetting the interface, or simply supplying host interface 510 with digital data and instructions to send.

FIG. 4 is a flow diagram of an embodiment of the present invention. In operation 610 normal data transmission occurs. This includes setting up a communication link between two modems, establishing a common communication protocol, receiving data from a host, encoding the received data according to the established common communication protocol, and transmitting the data as an analog wave form on a telephone line.

Operation 620 monitors the data received from a host and detects when a data under flow condition occurs. When an under flow is detected, operation 630 notifies the host of the data under flow. In addition, operation 640 provides alternate data to be encoded in substitute for the data from the host. The alternate data provided is typically an instruction or other action that requires no data from the host and keeps the communication link active. For example, a training instruction, an idle signal or a handshake negotiation instruction may be sent. Operation 630 notifies the host of the data under flow via either an interrupt message to the host, setting a condition flag in a readable port that is routinely polled by the host, or any other method of providing the host with notification of the event. When the host regains synchronism in operation 650, the host will take the necessary steps to continue sending data. This may include completing a handshake operation that operation 640 has begun, resetting the interface, or simply supplying the modem with digital data and instructions to send. The processing returns to operation 610, normal data transmission.

The modem of the preferred embodiment keeps the communication link between the two modems established. The present invention provides alternate data to keep the link active when there is a data under flow condition in the data received from the host or computer system. The receiving modem and receiving computer system are unaware of the loss of sending computer synchronism.

The present invention saves the computer user frustration, cost and time. When a communication link is lost, the connection must be reestablished and data previously sent may need to be resent. This may incur additional telephone toll charges, additional on-line service charges, and loss of time. When working with an on-line service, the link may not be reestablished immediately due to busy signals, and other on-line service problems.

There is no need for both modems to implement the present invention to gain the benefits of the invention. When the sending modem detects a loss of sending host synchronism, the present invention supplies alternate data to be sent to the receiving modem. The receiving modem and receiving host are unaware of the action and continue processing as normal.

The modem of the preferred embodiment of the invention corrects many types of loss of host synchronism. A computer system performing extensive bandwidth hungry applications such as multimedia applications may temporarily lose synchronism. A computer system may also lose synchronism when changing system parameters requiring reboot while working with an on line service.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A modem, comprising:
    a data encoding unit for receiving data from a host, and for converting the data into an analog wave form;
    a detection unit for detecting an under flow event in the received data; and
    a supply unit for providing alternate data to the data encoding unit for converting to the analog wave form, wherein the alternate data comprises a communication protocol instruction that does not require the receiving and converting of the data from the host.

2. The modem of claim 1, wherein the under flow event is indicative of a lack of the data from the host.

3. The modem of claim 1, wherein the under flow event is indicative of an impending lack of the data from the host.

4. The modem of claim 1, wherein the communication protocol instruction comprises at least one of a training signal, an idle signal, and a negotiation signal.

5. The modem of claim 1, further comprising a notification unit for notifying the host of the under flow event.

6. The modem of claim 5, wherein the notification unit is adapted to notify the host of the under flow event via a status register.

7. The modem of claim 5, wherein the notification unit is adapted to notify the host of the under flow event via an interrupt signal sent to the host.

8. The modem of claim 1, further comprising a host interface for receiving the data from the host and sending the data to the data encoding unit.

9. The modem of claim 8, wherein the supply unit is adapted to provide data in modulated format to the data encoding unit.

10. A system, comprising:
    a host processor;
    a modem coupled to the host processor via a host bus, the modem comprising:
        a data encoding unit for receiving digital data from the host bus, and for converting the digital data into an analog wave form;
        a detection unit for detecting an under flow event in the received digital data; and
        a supply unit for providing alternate data to the data encoding unit for converting to the analog wave form, wherein the alternate data comprises a communication protocol instruction that does not require the receiving and converting of the data from the host bus; and
    an external port coupled to the modem for sending said analog wave form from the data encoding unit to a phone line.

11. The system of claim 10, wherein the communication protocol instruction comprises at least one of a training signal, an idle signal, and a negotiation signal.

12. The system of claim 10, further comprising a notification unit for notifying the host of the under flow event.

13. A method of maintaining a modem to modem communication link by a sending modem during a loss of sending computer system synchronism, comprising:
    monitoring data received from the sending computer system;
    converting the data received from the sending computer system into an analog wave form and sending the analog wave form to a receiving modem;
    detecting a data under flow condition in the data received from the sending computer system; and
    supplying alternate data for converting into the analog wave form, wherein the alternate data comprises a communication protocol instruction that does not require the receiving and converting of the data from the sending computer system.

14. The method of claim 13, wherein supplying the alternate data includes supplying at least one of a training signal, an idle signal, and a negotiation signal.

15. The method of claim 13, further comprising notifying the host of the under flow event.

16. The modem of claim 15, wherein the data encoding unit comprises:
    a CODEC coupled to the host interface and adapted to receive the data from the host interface and produce the analog wave form; and
    a DAA coupled to the CODEC and adapted to receive the analog wave form from the CODEC and condition the analog wave form for coupling to a telephone line.

17. The modem of claim 16, wherein the supply unit is adapted to provide data in protocol format to the data encoding unit.

18. The modem of claim 15, wherein the data encoding unit comprises:
    a DSP coupled to the host interface and adapted to receive the data from the host interface and produce modulated data;
    a CODEC coupled to the DSP and adapted to receive the modulated data from the DSP and produce the analog wave form; and
    a DAA coupled to the CODEC and adapted to receive the analog wave form from the CODEC and condition the analog wave form for coupling to a telephone line.

19. The modem of claim 18, wherein the supply unit is adapted to provide digital data to the data encoding unit.

20. The modem of claim 15, wherein the data encoding unit comprises:
    a microcontroller coupled to the host interface and adapted to receive the data from the host interface and produce data in protocol format;
    a DSP coupled to the microcontroller and adapted to receive the data in protocol format from the microcontroller and produce modulated data;
    a CODEC coupled to the DSP and adapted to receive the modulated data from the DSP and produce the analog wave form; and
    a DAA coupled to the CODEC and adapted to receive the analog wave form from the CODEC and condition the analog wave form for coupling to a telephone line.

* * * * *